W. P. & T. H. FORD.
Cultivator-Teeth.
No 22,946.
Patented Feb 15, 1859.
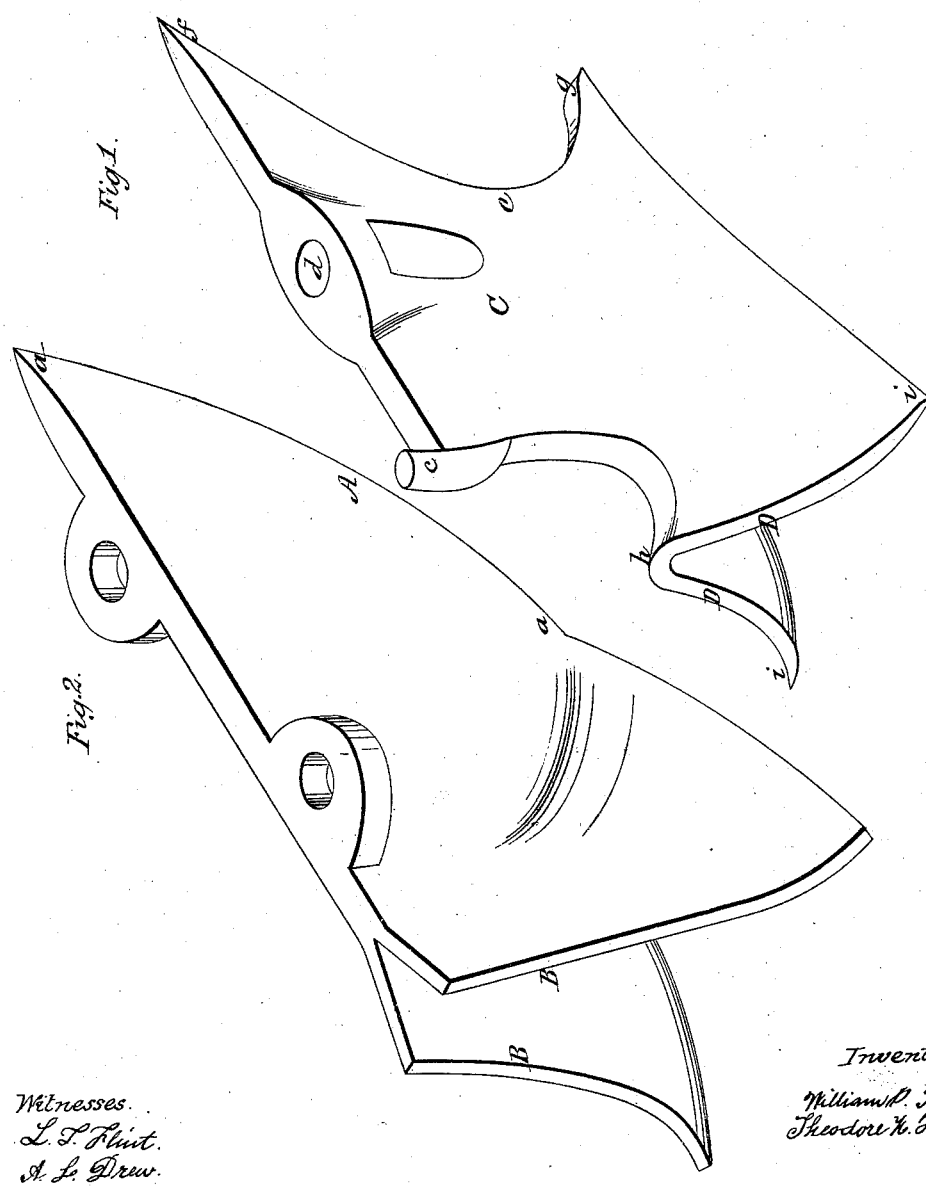
Witnesses.
L. P. Flint.
A. L. Drew.
Inventors.
William P. Ford
Theodore H. Ford

UNITED STATES PATENT OFFICE.

WM. P. FORD AND THEO. H. FORD, OF CONCORD, NEW HAMPSHIRE.

IMPROVEMENT IN CULTIVATOR-TEETH.

Specification forming part of Letters Patent No. 22,946, dated February 15, 1859.

*To all whom it may concern:*

Be it known that we, W. P. FORD and T. H. FORD, of Concord, in the county of Merrimack and State of New Hampshire, have invented an Improved Cultivator-Tooth, of which the following is a full, clear, and exact description, reference being had to the accompanying drawings, making part of this specification, in which—

Figure 1 is a perspective view of our improved tooth; Fig. 2, a view of a cultivator-tooth at present in use.

Objection has been made to cultivator-teeth of the ordinary form, whether of cast or sheet metal, that they clog up with weeds and grass at the neck of the tooth, or that part near the beam in which the tooth is secured. To obviate this a tooth has been made of the form represented in Fig. 2, in which the body of the tooth is prolonged forward in a vertical plane, the front edge, A, being inclined forward from $a$ to $b$, so as to ride up onto and over the roots, grass, and other obstructions. This would answer the purpose if the cultivator or harrow to which such teeth are attached could be made sufficiently heavy to prevent the teeth from being lifted by the inclined edge A out of the ground when this edge becomes dull or meets with any obstruction through which it cannot cut.

The first part of our invention consists in so forming the front edge of a cultivator-tooth that the tooth shall tend to run into the ground to the required depth, and yet shall not be liable to clog, as heretofore.

By again referring to Fig. 2 it will be seen that the wings B B, which flare out one on each side of a vertical plane passing longitudinally through the tooth, are extended up to the top of the tooth, or to the beam to which the tooth is attached. This tends to move the soil away from the central line in which the tooth is drawn along and to leave a furrow after the tooth has passed. This is a defect common to most of the cultivator-teeth with which we are acquainted, as the object of a cultivator is not to furrow the ground but merely to loosen and pulverize it and to leave its surface as level as possible.

The second part of our invention consists in remedying this objection by bringing the top of the wings together at a point so low down on the body of the tooth that the surface-soil may close back over the path of the tooth and not leave a furrow.

That others skilled in the art may understand and use our invention, we will proceed to describe the manner in which we have carried it out.

In the said drawings, C, Fig. 1, is the body of our improved tooth, which is secured to the cultivator-frame by a pin, $c$, and a bolt passing through the hole $d$. The front edge is made thin and sharp, is curved backward at $e$, so that the edge inclines forward from $e$ to $f$ at the top, to prevent weeds, grass, &c., from clogging up, and also inclines forward from $e$ to $g$ at the bottom, where it terminates in a flat point or nose, which is intended to penetrate the ground and cause the tooth to run in to the proper depth. The body C is thin and flat at its central portion, but flares out at the rear end into two wings, D, which start at the extreme rear from a point, $h$, and separate in a gradual curve till each terminates in a sharp edge, $i$, at the bottom or sole of the tooth, the curve being gradually lost in the body $c'$. The body $c'$ is cut away from the point $h$ to where the pin $c$ is attached. This is done to reduce the amount of surface of the sides of the body $c'$ and lessen the power required to draw the tooth through the ground. This also shortens the body and facilitates the turning of the cultivator. As the tooth is intended to be run at such a depth that the point $h$ shall be at or below the surface of the ground, we are enabled, with a cultivator-tooth constructed as above described, to loosen up and pulverize the soil in a most effective manner without leaving its surface filled with furrows, as is generally the case.

What we claim as our invention, and desire to secure by Letters Patent, is—

The above described cultivator-tooth, formed substantially as specified.

WILLIAM P. FORD.
THEODORE H. FORD.

Witnesses:
L. T. FLINT,
A. L. DREW.